United States Patent Office 2,849,484
Patented Aug. 26, 1958

2,849,484

SYNTHESIS OF CARBOXYLIC ACIDS

William H. Clingman, Jr., Texas City, Tex., assignor to The American Oil Company, Texas City, Tex., a corporation of Texas No Drawing. Application November 30, 1956
Serial No. 625,231

6 Claims. (Cl. 260—533)

This invention relates to the synthesis of carboxylic acids and in particular it concerns a process for preparing carboxylic acids which involves the ozonization of paraffinic hydrocarbons.

Heretofore, hydrocarbons have been ozonized to produce oxygenated compounds. The art relating to ozonization has been collected and analyzed by Long in "The Ozonization Reaction," Chemical Reviews, volume 27, pages 437–493 (1940). It is there indicated that the procedure heretofore known for producing carboxylic acids by means of an ozonization process consisted of the steps of ozonizing an olefin to convert it to the corresponding ozonide, followed by hydrolyzing the ozonide to produce a mixture of aldehydes, ketones, and carboxylic acids. The ozonization reaction is generally incomplete and the hydrolysis reaction is in certain cases so violent that there is serious danger of explosion. In addition, the hydrolysis mixture tends to become overheated so that the yield of products is lowered through degradation of the reaction materials.

It has subsequently been discovered that by ozonizing a mixture of olefins and water under alkaline conditions, carboxylic acids can be produced directly. When an attempt was made to produce carboxylic acids by the ozonization of a mixture of paraffinic hydrocarbons and water, I found that essentially no carboxylic acids were produced.

An object of this invention is to provide a process for producing carboxylic acids from paraffinic hydrocarbons. Another object is to provide an improved ozonization process in which paraffinic hydrocarbons are converted directly to carboxylic acids in high yields. Other objects and advantages of the present invention will be apparent from the more detailed description thereof.

I have discovered that when ozone is passed into a mixture of a paraffinic hydrocarbon with a liquid aqueous solution, the yields of carboxylic acids can be greatly increased by including dichromate ion ($Cr_2O_7^=$) in the aqueous solution while maintaining the pH of the aqueous solution below 3. By including dichromate ion and a strong mineral acid in the aqueous solution, higher conversions of paraffinic hydrocarbon to carboxylic acids can be obtained than are expected from the additive effects of using the acid and the dichromate ion individually in the aqueous solution. The simultaneous use of the two materials functions in an unexpected and synergistic manner to produce unexpectedly high yields of carboxylic acids with a minimized proportion of hydrocarbons being degraded to lower molecular weight products and gas. Thus a gaseous stream containing ozone may be passed through an intimate mixture of paraffinic hydrocarbons and an aqueous solution, the latter solution preferably being between about 0.1 and 5 molar with respect to dichromate ion and 0.1 to 10 molar with respect to a strong acid such as $H_2SO_4$, etc. to produce carboxylic acids directly. Suitable reaction temperatures are below about 100° C.

The process of this invention is applicable to paraffinic hydrocarbons, for example those having from 3 to 20 carbon atoms although not necessarily limited thereto. Paraffinic hydrocarbons including aliphatic and alicyclic hydrocarbons may be employed. When the process is practised on the saturated alicyclic hydrocarbons (naphthenes), especially alicyclic mononuclear paraffins such as cyclohexane, methylcyclohexane, tertiarybutylcyclohexane and the like, it is effective in producing high yields of dibasic carboxylic acids. However, aliphatic paraffins such as n-octane, isooctane, isopentanes, hydrogenated diisobutylene or hydrogenated dimers and trimers of propylene, isobutylene, etc. as well as many other aliphatic hydrocarbons may suitably be employed. This invention is not applicable to the treatment of olefinic hydrocarbons because of the non-selective manner in which the reaction proceeds and thereby produces a wide variety of lower molecular weight products, and because the process offers no advantage over merely using an aqueous solution rather than one which contains the strong acid and dichromate ion.

The reaction is carried out by commingling the paraffinic hydrocarbon with the aqueous solution so as to produce an intimate mixture of the paraffinic hydrocarbons with the aqueous solution. Between about 0.5 and 50 volumes of the aqueous solution per volume of the paraffinic hydrocarbons may be so commingled. Between about 20 to 40 volumes of aqueous solution per volume of hydrocarbons is very satisfactory. A gaseous stream such as nitrogen, air, or other diluting gas which contains ozone usually in a concentration of from 1 to 10 percent but not necessarily limited thereto is passed into the intimate mixture of hydrocarbons with the aqueous solution. The gaseous stream which passes through the intimate mixture can be recovered and recycled to the reaction zone, usually with added ozone as make-up for the amount consumed. Since an increase in the concentration of ozone in the reaction mixture increases the rate of conversion, superatmospheric pressures might be employed to cause more ozone to enter into the solution. The mixture of paraffinic hydrocarbons with the aqueous solution may suitably be maintained at a temperature below 100° C. during the course of the ozonization, preferably between about 40 to 80° C., although the invention is not necessarily limited to such temperatures. Reaction times of from 0.5 to 10 hours, e. g. 5 hours, are usually satisfactory.

The aqueous solution should be maintained at a pH of less than 3 (corresponding to .0005 molar with respect to $H_2SO_4$). Highly satisfactory results are obtained when the aqueous solution is between about 0.1 and 10 molar with respect to a strong acid such as $H_2SO_4$, HCl, $H_3PO_4$ or other strong mineral acid. Aqueous solutions which are between about 1 to 5 molar in $H_2SO_4$ are particularly satisfactory for use in the present invention.

The aqueous solution must also contain dichromate ion ($Cr_2O_7^=$). By carrying out the ozonization in the presence of the strong acid and dichromate ion, higher conversions of the paraffinic hydrocarbon to carboxylic acid can be obtained than are expected from the additive effects obtained when the acid and the dichromate ion are used individually in the aqueous solution. Their joint action functions synergistically to produce high yields of carboxylic acids with a minimized proportion of the hydrocarbons being degraded to lower molecular weight products and gas. The synergistically beneficial effect of the dichromate ion in increasing the yield of carboxylic acids is not obtained if the ozonization is carried out in the absence of dichromate ion and the intermediates formed are subsequently treated with an aqueous solution of dichromate ion to produce carboxylic acids. Thus it is essential that the dichromate ion be present in the acidic aqueous solution which is mixed with the paraffinic hydrocarbon and contacted with ozone. The aqueous solution may be from 0.1 to 5 molar with respect to dichromate ion, suitably from 0.5 to 3 molar, e. g. 1 molar with respect to dichromate ion. Any of the convenient sources of dichromate ion such as the alkali dichromates, e. g. $K_2Cr_2O_7$, $Na_2Cr_2O_7$ etc., $CrO_3$ or other convenient source of dichromate ion can be employed.

After carrying out the reaction, the carboxylic acids can be recovered from the reaction products by any of the suitable techniques heretofore known. For example, after the paraffinic hydrocarbons have been converted, the reaction products can be settled and insoluble carboxylic acids removed from the aqueous system. Carboxylic acids which remain in the solution can be recovered by passage of the aqueous solution through a suitable adsorbent such as activated charcoal, silica gel or some similar substance upon which they are adsorbed and from which they can be subsequently eluted and recovered. A suitable alternate method for recovering the carboxylic acids which are soluble in the aqueous solution is to extract the aqueous solution with a suitable solvent such as ether, etc. and then separate the extracted carboxylic acids from the solvent.

Experiments were carried out which show the surprising advantage obtained by the process of this invention. Laboratory experiments 1–4 inclusive were carried out by placing approximately 5 grams of tertiary-butylcyclohexane in a glass flask. Water was then added usually in the amount of 75–100 grams. In Run No. 1 the aqueous solution contained no acid nor did it contain any dichromate ion. In Run No. 2 the aqueous solution contained 39 grams of $H_2SO_4$ which rendered the aqueous solution 4 molar with respect to $H_2SO_4$. In Run No. 3 the aqueous solution contained no acid, but it contained 30 grams of $Na_2Cr_2O_7 \cdot 2H_2O$ which made the solution 1 molar with respect to dichromate ion. In Run No. 4 the aqueous solution contained 39 grams of $H_2SO_4$ (4 molar with respect to $H_2SO_4$) and 30 grams of $$Na_2Cr_2O_7 \cdot 2H_2O$$

(1 molar with respect to dichromate ion). The reactants were rapidly agitated by a sealed stirrer during the run to insure complete mixing of the hydrocarbon with the aqueous solution. The reactants were maintained at a temperature of approximately 50° C. by means of a constant temperature bath. A gaseous stream of oxygen containing about 5 mole percent ozone was bubbled through the reactants through a fritted disc in the bottom of the flask over the course of the reaction time which was approximately 6 hours in each experiment. Exit gases from the reactor were passed through a condenser to return vaporized reactants and then through a solution of potassium iodide to decompose unreacted ozone.

At the end of the experiments the flask and condenser were rinsed with water and n-heptane, and the aqueous and organic phases were separated. Dibasic carboxylic acids in the product were determined by precipitation of the insoluble silver salts after previous removal of $CrO_4^=$ and $SO_4^=$ as the insoluble barium salts. $Cr^{+3}$ was removed as $Cr(OH)_3$. This procedure provides an approximate determination of the total amounts of tertiary-butyl adipic, adipic, glutaric, and succinic acids. Run No. 5 reports the results obtained by Durland and Adkins (Chemical Reviews, volume 27, page 455 (1940)) when they passed a gaseous stream containing 1–2 percent ozone through a carbon tetrachloride solution of cyclohexane at 0° C. for 100 hours. The results obtained in the laboratory experiments and the results obtained by the prior art are shown in the table which follows:

| Run No. | Concentration in aqueous solution of— | | Conversion to dibasic acids, mol percent of naphthene feed |
|---|---|---|---|
| | $H_2SO_4$ | $Cr_2O_7^=$ | |
| 1 | 0 | 0 | 0 |
| 2 | 4 M | 0 | 8 |
| 3 | 0 | 1 M | 3.5 |
| 4 | 4 M | 1 M | 49 |
| 5 | (1) | (1) | 5 |

[1] Prior art technique.

Run No. 1 shows that when the aqueous solution contained no strong acid and no dichromate ion, none of the naphthene was converted to dibasic acids. Runs No. 2 and 3 indicate that when the aqueous solution contains the strong mineral acid or the dichromate ion individually, approximately 8% and 3.5% respectively of the naphthene is converted to dibasic acids. Run No. 4 shows that by employing sulphuric acid and dichromate ion simultaneously in the aqueous solution, 49% of the naphthene is converted to dibasic acids. This demonstrates the synergistic effect obtained by joint use of a strong acid and dichromate ion in the aqueous solution.

These results are far better than the 5 mol percent conversion of naphthene to dibasic acid which was obtained by the prior art as shown in Run No. 5.

Thus having described the invention what is claimed is:

1. In a process for preparing carboxylic acids by intimately commingling an alicyclic paraffinic hydrocarbon with a liquid aqueous solution, passing a gaseous stream containing ozone through the resulting mixture, and separating a carboxylic acid from the resulting reaction products, the improvement which comprises including dichromate ion in the aqueous solution and maintaining the pH of said aqueous solution below 3.

2. The process of claim 1 in which the pH is maintained at less than 3 by the use of sulphuric acid.

3. In a process for preparing carboxylic acids by intimately commingling an alicyclic mononuclear paraffinic hydrocarbon with a liquid aqueous solution, passing a gaseous stream containing ozone through the resulting mixture, and separating a carboxylic acid from the resulting reaction products, the improvement which comprises maintaining the aqueous solution between about 0.1 and 10 molar with respect to a strong mineral acid and maintaining the aqueous solution between about 0.1 and 5 molar with respect to dichromate ion.

4. The process of claim 3 in which the resulting mixture of paraffinic hydrocarbon and liquid aqueous solution is maintained at a temperature not higher than about 100° C.

5. The process of claim 3 wherein the alicyclic paraffin is tertiary-butylcyclohexane.

6. In a process for preparing dibasic carboxylic acids by intimately commingling an alicyclic mononuclear paraffin with a liquid aqueous solution, passing a gaseous stream containing ozone through the resulting mixture, and separating a dibasic carboxylic acid from the resulting reaction products, the improvement which comprises maintaining the aqueous solution between about 0.1 and 10 molar with respect to sulphuric acid and maintaining the aqueous solution between about 0.1 and 5 molar with respect to dichromate ion while employing between about 0.5 and 50 volumes of said aqueous solution per volume of paraffinic hydrocarbon and effecting the contacting of said resulting mixture at a temperature not higher than 100° C.

References Cited in the file of this patent

UNITED STATES PATENTS

| 2,005,774 | Demont | June 25, 1935 |
| 2,505,646 | Meuly | Apr. 25, 1950 |

FOREIGN PATENTS

| 339,562 | Germany | July 27, 1921 |

OTHER REFERENCES

Long, Jr.: Chem. Reviews, vol. 27, pp. 455–56 (1940).
Groggins: Unit Processes in Organic Synthesis, 4th ed., pp. 418–19 (1952).